(12) United States Patent
Cummings et al.

(10) Patent No.: US 11,358,331 B2
(45) Date of Patent: Jun. 14, 2022

(54) SYSTEM AND HEAD FOR CONTINUOUSLY MANUFACTURING COMPOSITE STRUCTURE

(71) Applicant: Continuous Composites Inc., Coeur d'Alene, ID (US)

(72) Inventors: Kyle Frank Cummings, Coeur d'Alene, ID (US); Marcus Raye Vincent Brodie, Coeur d'Alene, ID (US); Samuel VanDenBerg, Hayden, ID (US); Ryan C. Stockett, Spokane, WA (US)

(73) Assignee: Continuous Composites inc., Coeur d'Alene, ID (US)

( * ) Notice: Subject to any disclaimer, the term of this patent is extended or adjusted under 35 U.S.C. 154(b) by 85 days.

(21) Appl. No.: 16/516,113

(22) Filed: Jul. 18, 2019

(65) Prior Publication Data

US 2020/0156315 A1 May 21, 2020

Related U.S. Application Data

(60) Provisional application No. 62/853,610, filed on May 28, 2019, provisional application No. 62/769,498, filed on Nov. 19, 2018.

(51) Int. Cl.
*B29C 64/20* (2017.01)
*B29C 64/209* (2017.01)
(Continued)

(52) U.S. Cl.
CPC .......... *B29C 64/209* (2017.08); *B29C 64/165* (2017.08); *B29C 64/264* (2017.08); *B33Y 10/00* (2014.12); *B33Y 30/00* (2014.12)

(58) Field of Classification Search
CPC ... B29C 64/209; B29C 64/264; B29C 64/165; B33Y 10/00; B33Y 30/00
See application file for complete search history.

(56) References Cited

U.S. PATENT DOCUMENTS 3,286,305 A  11/1966 Seckel
3,809,514 A   5/1974 Nunez
(Continued)

FOREIGN PATENT DOCUMENTS

DE   4102257 A1   7/1992
EP   2661551 A1  11/2013
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Matthew J Daniels
*Assistant Examiner* — Shibin Liang
(74) *Attorney, Agent, or Firm* — Ryan C. Stockett (57) ABSTRACT

A system is disclosed for additively manufacturing a composite structure. The system may include a print head configured to discharge a continuous reinforcement that is at least partially coated in a matrix, and a compactor configured to compact the continuous reinforcement and the matrix. The system may also include a cure enhancer configured to direct a path of cure energy toward the matrix after discharge, wherein the path of cure energy passes through at least a portion of the compactor.

17 Claims, 5 Drawing Sheets

(51) Int. Cl.
  *B33Y 30/00* (2015.01)
  *B33Y 10/00* (2015.01)
  *B29C 64/264* (2017.01)
  *B29C 64/165* (2017.01)

(56) References Cited

U.S. PATENT DOCUMENTS

| | | | |
|---|---|---|---|
| 3,984,271 | A | 10/1976 | Gilbu |
| 3,993,726 | A | 11/1976 | Moyer |
| 4,643,940 | A | 2/1987 | Shaw et al. |
| 4,671,761 | A | 6/1987 | Adrian et al. |
| 4,822,548 | A | 4/1989 | Hempel |
| 4,851,065 | A | 7/1989 | Curtz |
| 5,002,712 | A | 3/1991 | Goldmann et al. |
| 5,037,691 | A | 8/1991 | Medney et al. |
| 5,296,335 | A | 3/1994 | Thomas et al. |
| 5,340,433 | A | 8/1994 | Crump |
| 5,425,848 | A * | 6/1995 | Haisma .............. B29C 39/148 216/48 |
| 5,746,967 | A | 5/1998 | Hoy et al. |
| 5,866,058 | A | 2/1999 | Batchelder et al. |
| 5,936,861 | A | 8/1999 | Jang et al. |
| 6,153,034 | A | 11/2000 | Lipsker |
| 6,459,069 | B1 | 10/2002 | Rabinovich |
| 6,501,554 | B1 | 12/2002 | Hackney et al. |
| 6,799,081 | B1 | 9/2004 | Hale et al. |
| 6,803,003 | B2 | 10/2004 | Rigali et al. |
| 6,934,600 | B2 | 8/2005 | Jang et al. |
| 7,039,485 | B2 | 5/2006 | Engelbart et al. |
| 7,555,404 | B2 | 6/2009 | Brennan et al. |
| 7,795,349 | B2 | 9/2010 | Bredt et al. |
| 8,221,669 | B2 | 7/2012 | Batchelder et al. |
| 8,962,717 | B2 | 2/2015 | Roth et al. |
| 9,126,365 | B1 | 9/2015 | Mark et al. |
| 9,126,367 | B1 | 9/2015 | Mark et al. |
| 9,149,988 | B2 | 10/2015 | Mark et al. |
| 9,156,205 | B2 | 10/2015 | Mark et al. |
| 9,186,846 | B1 | 11/2015 | Mark et al. |
| 9,186,848 | B2 | 11/2015 | Mark et al. |
| 9,327,452 | B2 | 5/2016 | Mark et al. |
| 9,327,453 | B2 | 5/2016 | Mark et al. |
| 9,370,896 | B2 | 6/2016 | Mark |
| 9,381,702 | B2 | 7/2016 | Hollander |
| 9,457,521 | B2 | 10/2016 | Johnston et al. |
| 9,458,955 | B2 | 10/2016 | Hammer et al. |
| 9,527,248 | B2 | 12/2016 | Hollander |
| 9,539,762 | B2 | 1/2017 | Durand et al. |
| 9,579,851 | B2 | 2/2017 | Mark et al. |
| 9,688,028 | B2 | 6/2017 | Mark et al. |
| 9,694,544 | B2 | 7/2017 | Mark et al. |
| 9,757,879 | B2 | 9/2017 | Engel |
| 9,764,378 | B2 | 9/2017 | Peters et al. |
| 9,770,876 | B2 | 9/2017 | Farmer et al. |
| 9,782,926 | B2 | 10/2017 | Witzel et al. |
| 9,796,140 | B2 * | 10/2017 | Page ................. B29C 70/06 |
| 10,427,332 | B2 | 10/2019 | Engel |
| 2002/0009935 | A1 | 1/2002 | Hsiao et al. |
| 2002/0062909 | A1 | 5/2002 | Jang et al. |
| 2002/0113331 | A1 | 8/2002 | Zhang et al. |
| 2002/0165304 | A1 | 11/2002 | Mulligan et al. |
| 2003/0044539 | A1 | 3/2003 | Oswald |
| 2003/0056870 | A1 | 3/2003 | Comb et al. |
| 2003/0160970 | A1 | 8/2003 | Basu et al. |
| 2003/0186042 | A1 | 10/2003 | Dunlap et al. |
| 2003/0236588 | A1 | 12/2003 | Jang et al. |
| 2005/0006803 | A1 | 1/2005 | Owens |
| 2005/0061422 | A1 | 3/2005 | Martin |
| 2005/0104257 | A1 | 5/2005 | Gu et al. |
| 2005/0109451 | A1 | 5/2005 | Hauber et al. |
| 2005/0230029 | A1 | 10/2005 | Vaidyanathan et al. |
| 2007/0003650 | A1 | 1/2007 | Schroeder |
| 2007/0228592 | A1 | 10/2007 | Dunn et al. |
| 2008/0176092 | A1 | 7/2008 | Owens |
| 2009/0095410 | A1 | 4/2009 | Oldani |
| 2011/0032301 | A1 | 2/2011 | Fienup et al. |
| 2011/0143108 | A1 | 6/2011 | Fruth et al. |
| 2012/0060468 | A1 | 3/2012 | Dushku et al. |
| 2012/0159785 | A1 | 6/2012 | Pyles et al. |
| 2012/0231225 | A1 | 9/2012 | Mikulak et al. |
| 2012/0247655 | A1 | 10/2012 | Erb et al. |
| 2013/0164498 | A1 | 6/2013 | Langone et al. |
| 2013/0209600 | A1 | 8/2013 | Tow |
| 2013/0233471 | A1 | 9/2013 | Kappesser et al. |
| 2013/0260110 | A1 * | 10/2013 | Yasukochi .......... B29C 35/0894 428/195.1 |
| 2013/0292039 | A1 | 11/2013 | Peters et al. |
| 2013/0337256 | A1 | 12/2013 | Farmer et al. |
| 2013/0337265 | A1 | 12/2013 | Farmer |
| 2014/0034214 | A1 | 2/2014 | Boyer et al. |
| 2014/0061974 | A1 | 3/2014 | Tyler |
| 2014/0159284 | A1 | 6/2014 | Leavitt |
| 2014/0232035 | A1 | 8/2014 | Bheda |
| 2014/0268604 | A1 | 9/2014 | Wicker et al. |
| 2014/0291886 | A1 | 10/2014 | Mark et al. |
| 2015/0136455 | A1 | 5/2015 | Fleming |
| 2015/0273726 | A1 | 10/2015 | Okamoto |
| 2016/0012935 | A1 | 1/2016 | Rothfuss |
| 2016/0031155 | A1 | 2/2016 | Tyler |
| 2016/0046082 | A1 | 2/2016 | Fuerstenberg |
| 2016/0052208 | A1 | 2/2016 | Debora et al. |
| 2016/0082641 | A1 | 3/2016 | Bogucki et al. |
| 2016/0082659 | A1 | 3/2016 | Hickman et al. |
| 2016/0107379 | A1 | 4/2016 | Mark et al. |
| 2016/0114532 | A1 | 4/2016 | Schirtzinger et al. |
| 2016/0136885 | A1 | 5/2016 | Nielsen-Cole et al. |
| 2016/0144565 | A1 | 5/2016 | Mark et al. |
| 2016/0144566 | A1 | 5/2016 | Mark et al. |
| 2016/0192741 | A1 | 7/2016 | Mark |
| 2016/0200047 | A1 | 7/2016 | Mark et al. |
| 2016/0243762 | A1 | 8/2016 | Fleming et al. |
| 2016/0263806 | A1 | 9/2016 | Gardiner |
| 2016/0263822 | A1 | 9/2016 | Boyd |
| 2016/0263823 | A1 | 9/2016 | Espiau et al. |
| 2016/0271876 | A1 | 9/2016 | Lower |
| 2016/0297104 | A1 | 10/2016 | Guillemette et al. |
| 2016/0311165 | A1 | 10/2016 | Mark et al. |
| 2016/0325491 | A1 | 11/2016 | Sweeney et al. |
| 2016/0332369 | A1 | 11/2016 | Shah et al. |
| 2016/0339633 | A1 | 11/2016 | Stolyarov et al. |
| 2016/0346998 | A1 | 12/2016 | Mark et al. |
| 2016/0361869 | A1 | 12/2016 | Mark et al. |
| 2016/0368213 | A1 | 12/2016 | Mark |
| 2016/0368255 | A1 | 12/2016 | Witte et al. |
| 2017/0001384 | A1 | 1/2017 | Eitzinger et al. |
| 2017/0007359 | A1 | 1/2017 | Kopelman et al. |
| 2017/0007360 | A1 | 1/2017 | Kopelman et al. |
| 2017/0007361 | A1 | 1/2017 | Boronkay et al. |
| 2017/0007362 | A1 | 1/2017 | Chen et al. |
| 2017/0007363 | A1 | 1/2017 | Boronkay |
| 2017/0007365 | A1 | 1/2017 | Kopelman et al. |
| 2017/0007366 | A1 | 1/2017 | Kopelman et al. |
| 2017/0007367 | A1 | 1/2017 | Li et al. |
| 2017/0007368 | A1 | 1/2017 | Boronkay |
| 2017/0007386 | A1 | 1/2017 | Mason et al. |
| 2017/0008333 | A1 | 1/2017 | Mason et al. |
| 2017/0015059 | A1 | 1/2017 | Lewicki |
| 2017/0015060 | A1 | 1/2017 | Lewicki et al. |
| 2017/0021565 | A1 | 1/2017 | Deaville |
| 2017/0028434 | A1 | 2/2017 | Evans et al. |
| 2017/0028588 | A1 | 2/2017 | Evans et al. |
| 2017/0028617 | A1 | 2/2017 | Evans et al. |
| 2017/0028619 | A1 | 2/2017 | Evans et al. |
| 2017/0028620 | A1 | 2/2017 | Evans et al. |
| 2017/0028621 | A1 | 2/2017 | Evans et al. |
| 2017/0028623 | A1 | 2/2017 | Evans et al. |
| 2017/0028624 | A1 | 2/2017 | Evans et al. |
| 2017/0028625 | A1 | 2/2017 | Evans et al. |
| 2017/0028627 | A1 | 2/2017 | Evans et al. |
| 2017/0028628 | A1 | 2/2017 | Evans et al. |
| 2017/0028633 | A1 | 2/2017 | Evans et al. |
| 2017/0028634 | A1 | 2/2017 | Evans et al. |
| 2017/0028635 | A1 | 2/2017 | Evans et al. |
| 2017/0028636 | A1 | 2/2017 | Evans et al. |
| 2017/0028637 | A1 | 2/2017 | Evans et al. |

(56) References Cited

U.S. PATENT DOCUMENTS

| | | |
|---|---|---|
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda et al. |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2017/0305041 A1 | 10/2017 | Engel |
| 2019/0016066 A1* | 1/2019 | Schlegel ............... B29C 70/504 |
| 2020/0164572 A1* | 5/2020 | Bartow ................. B33Y 70/10 |

FOREIGN PATENT DOCUMENTS

| | | |
|---|---|---|
| EP | 2589481 B1 | 1/2016 |
| EP | 3124213 A1 | 2/2017 |
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 * | 9/2017 ............ B29C 67/00 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

International Search Report dated Sep. 30, 2019 for PCT/US2019/043733 to Continuous Composites Inc. Filed Jul. 26, 2019.

* cited by examiner

SYSTEM AND HEAD FOR CONTINUOUSLY MANUFACTURING COMPOSITE STRUCTURE

RELATED APPLICATIONS

This application is based on and claims the benefit of priority from U.S. Provisional Application Nos. 62/769,498 that was filed on Nov. 19, 2018 and 62/853,610 that was filed on May 28, 2019, the contents of all of which are expressly incorporated herein by reference.

TECHNICAL FIELD

The present disclosure relates generally to a manufacturing system and, more particularly, to a system and head for continuously manufacturing composite structures.

BACKGROUND

Continuous fiber 3D printing (a.k.a., CF3D®) involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a head-mounted cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although CF3D® provides for increased strength, compared to manufacturing processes that do not utilize continuous fiber reinforcement, improvements can be made to the structure and/or operation of existing systems. The disclosed additive manufacturing system is uniquely configured to provide these improvements and/or to address other issues of the prior art.

SUMMARY

In one aspect, the present disclosure is directed to an additive manufacturing system. The additive manufacturing system may include a print head configured to discharge a continuous reinforcement that is at least partially coated in a matrix, and a compactor configured to compact the continuous reinforcement and the matrix. The additive manufacturing system may also include a cure enhancer configured to direct a path of cure energy toward the matrix after discharge, wherein the path of cure energy passes through at least a portion of the compactor.

In another aspect, the present disclosure is directed to a method for additively manufacturing a composite structure. The method may include discharging a continuous reinforcement that is at least partially coated in a matrix, and compacting the continuous reinforcement and the matrix with a compactor. The method may also include directing cure energy through the compactor toward the matrix.

DETAILED DESCRIPTION

Figure 1:
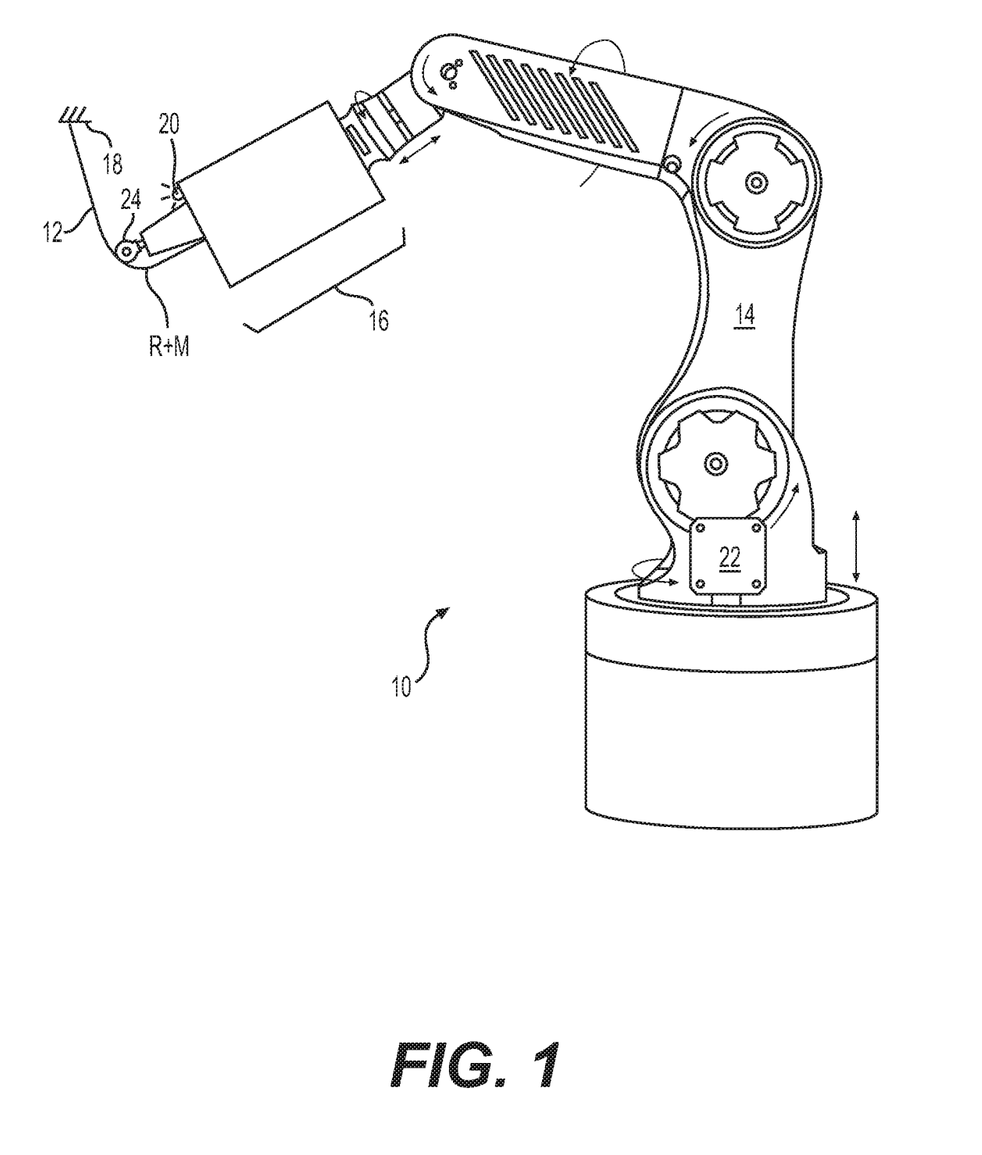
FIG. 1 is a diagrammatic illustration of an exemplary disclosed additive manufacturing system.

FIG. 1 illustrates an exemplary system 10, which may be used to manufacture a composite structure 12 having any desired cross-sectional shape (e.g., ellipsoidal, polygonal, etc.). System 10 may include at least a moveable support 14 and a print head ("head") 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry, a hybrid gantry/arm, or another type of movement system that is capable of moving head 16 in multiple directions during fabrication of structure 12. Although support 14 is shown as being capable of multi-axis (e.g., six or more axes) movement, it is contemplated that any other type of support 14 capable of moving head 16 in the same or in a different manner could also be utilized, if desired. In some embodiments, a drive may mechanically couple head 16 to support 14 and may include components that cooperate to move and/or supply power or materials to head 16.

Head 16 may be configured to receive or otherwise contain a matrix. The matrix may include any type of material (e.g., a liquid resin, such as a zero-volatile organic compound resin; a powdered metal; a solid filament, etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, reversible resins (e.g., Triazolinedione, a covalent-adaptable network, a spatioselective reversible resin, etc.) and more. In one embodiment, the matrix inside head 16 may be pressurized, for example by an external device (e.g., an extruder or another type of pump—not shown) that is connected to head 16 via a corresponding conduit (not shown). In another embodiment, however, the matrix pressure may be generated completely inside of head 16 by a similar type of device. In yet other embodiments, the matrix may be gravity-fed through and/or mixed within head 16. In some instances, the matrix inside head 16 may need to be kept cool and/or dark to inhibit premature curing; while in other instances, the matrix may need to be kept warm for similar reasons. In either situation, head 16 may be specially configured (e.g., insulated, temperature-controlled, shielded, etc.) to provide for these needs.

The matrix may be used to coat, encase, or otherwise at least partially surround (e.g., wet) any number of continuous reinforcements (e.g., separate fibers, tows, rovings, ribbons, and/or sheets of material) and, together with the reinforcements, make up at least a portion (e.g., a wall) of composite structure 12. The reinforcements may be stored within (e.g., on separate internal spools—not shown) or otherwise passed through head 16 (e.g., fed from one or more external spools—not shown). When multiple reinforcements are simultaneously used, the reinforcements may be of the same type and have the same diameter and cross-sectional shape (e.g., circular, square, flat, hollow, solid, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from head 16.

The reinforcements may be exposed to (e.g., coated with) the matrix while the reinforcements are inside head 16, while the reinforcements are being passed to head 16 (e.g., as a prepreg material), and/or while the reinforcements are discharging from head 16, as desired. The matrix, dry reinforcements, and/or reinforcements that are already exposed to the matrix (e.g., wetted reinforcements) may be transported into head 16 in any manner apparent to one skilled in the art.

The matrix and reinforcement may be discharged from head 16 via at least two different modes of operation. In a first mode of operation, the matrix and reinforcement are extruded (e.g., pushed under pressure and/or mechanical force) from head 16, as head 16 is moved by support 14 to create the 3-dimensional shape of structure 12. In a second mode of operation, at least the reinforcement is pulled from head 16, such that a tensile stress is created in the reinforcement during discharge. In this mode of operation, the matrix may cling to the reinforcement and thereby also be pulled from head 16 along with the reinforcement, and/or the matrix may be discharged from head 16 under pressure along with the pulled reinforcement. In the second mode of operation, where the matrix material is being pulled from head 16 with the reinforcement, the resulting tension in the reinforcement may increase a strength of structure 12 (e.g., by aligning the reinforcements, inhibiting buckling, equally distributing loads, etc.), while also allowing for a greater length of unsupported structure 12 to have a straighter trajectory (e.g., by creating moments that oppose gravity).

The reinforcement may be pulled from head 16 as a result of head 16 moving away from an anchor point 18. In particular, at the start of structure-formation, a length of matrix-impregnated reinforcement may be pulled and/or pushed from head 16, deposited onto a stationary or moveable anchor point 18, and cured, such that the discharged material adheres to anchor point 18. Thereafter, head 16 may be moved away from anchor point 18, and the relative movement may cause additional reinforcement to be pulled from head 16. It should be noted that the movement of the reinforcement through head 16 could be assisted (e.g., via internal feed mechanisms), if desired. However, the discharge rate of the reinforcement from head 16 may primarily be the result of relative movement between head 16 and anchor point 18, such that tension is created within the reinforcement.

Figure 2:
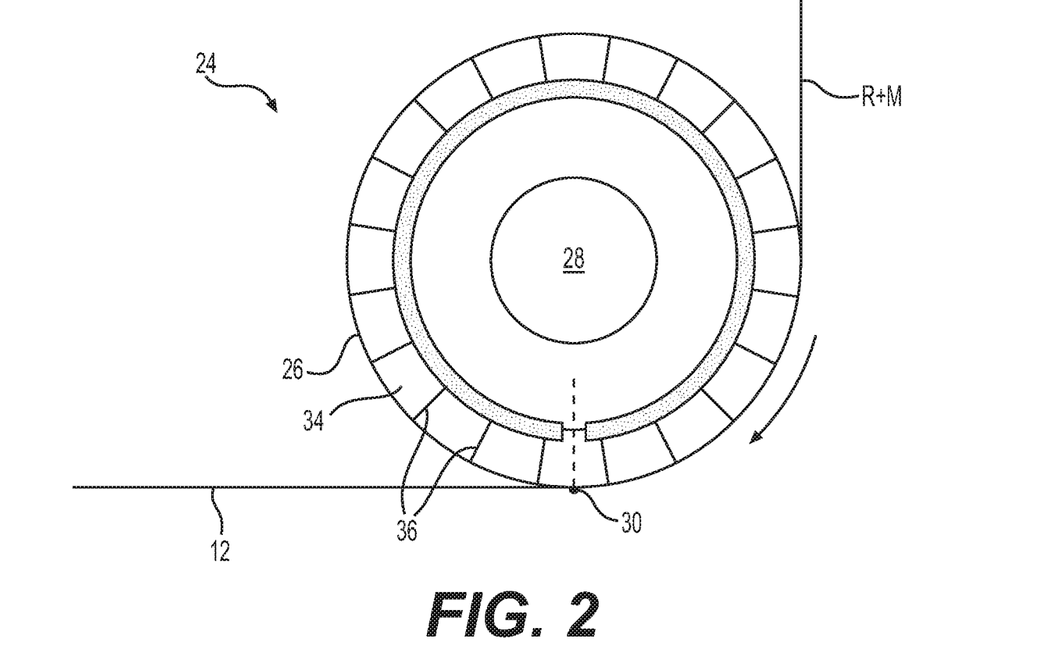
FIGS. 2 and 3 are end-view and cross-sectional illustrations, respectively, of an exemplary disclosed compactor that may be utilized with the system of FIG. 1.

Any number of reinforcements (represented as "R") may be passed axially through head 16 and be discharged together with at least a partial coating of matrix (matrix represented as "M" in FIG. 2). At discharge (or shortly thereafter), one or more cure enhancers (e.g., one or more light sources, ultrasonic emitters, lasers, heaters, catalyst dispensers, microwave generators, etc.) 20 may expose the matrix coating to a cure energy (e.g., light energy, electromagnetic radiation, vibrations, heat, a chemical catalyst or hardener, etc.). The cure energy may trigger a chemical reaction, increase a rate of chemical reaction already occurring within the matrix, sinter the material, harden the material, or otherwise cause the material to cure as it discharges from head 16.

A controller 22 may be provided and communicatively coupled with support 14, head 16, and any number and type of cure enhancers 20. Controller 22 may embody a single processor or multiple processors that include a means for controlling an operation of system 10. Controller 22 may include one or more general- or special-purpose processors or microprocessors. Controller 22 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 22, including power supply circuitry, signal-conditioning circuitry, solenoid/motor driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of models, lookup tables, graphs, and/or equations. In the disclosed embodiment, the maps are used by controller 22 to determine desired characteristics of cure enhancers 20, the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired curing. Controller 22 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 20, such that structure 12 is produced in a desired manner.

In some applications, higher levels of interlaminar strength, increased fiber volume, and/or decreased void content may be realized by pressing newly discharging material against underlying layers of material that were discharged during previous fabrication passes of head 16, before and/or while the newly discharged material is exposed to the energy from cure enhancers 20. Historically, this pressing action was facilitated by a rolling or sliding compactor located at the discharge end of head 16. An exemplary compactor 24 is illustrated in FIGS. 2 and 3.

Figure 3:
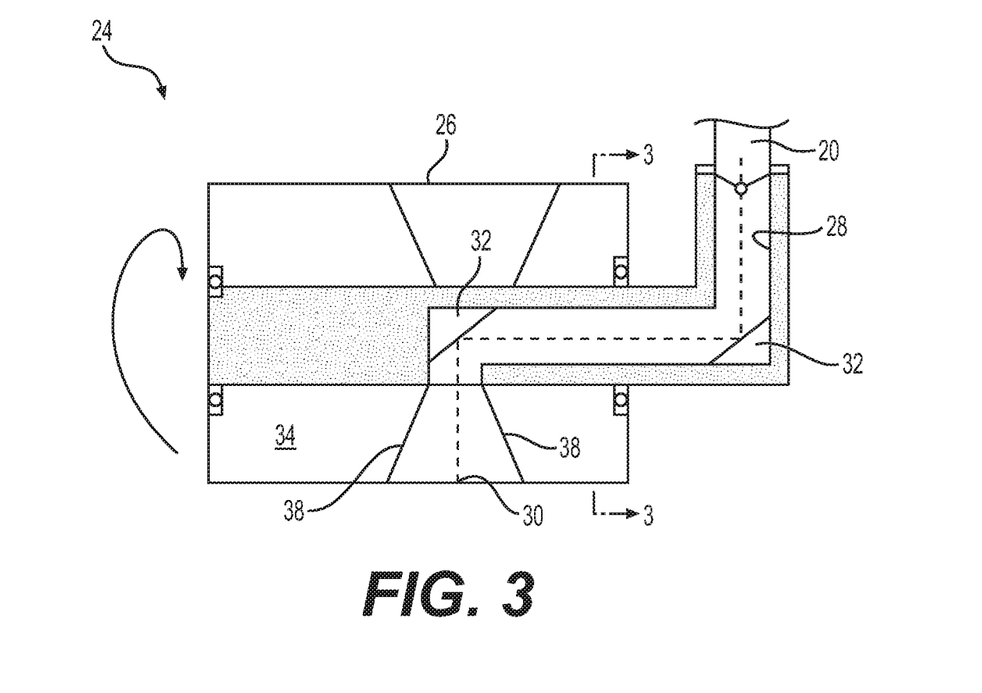

As shown in the embodiments of FIGS. 2 and 3, compactor 24 may include a wheel 26 that functions as a nip point of head 16 (e.g., a final point of deposition and/or curing, where wheel 26 engages previously discharged layers of structure 12 and/or a build platform). One or more internal conduits 28 may extend from cure enhancer(s) 20 (e.g., from a laser or UV light) to a curing location 30 at a periphery of compactor 24. For example, conduit(s) 28 may extend axially through a general center of wheel 26, and then radially to the outer periphery. Alternatively, conduit(s) 28 may extend radially and then axially or diagonally, as desired. It is contemplated that curing location 30 could be positioned closer to an end of wheel 26, if desired. One or more optical components (e.g., mirrors, filters, prisms, lenses, etc.) 32 may be used to direct, filter, focus, or otherwise condition energy from cure enhancer(s) 20 prior to the energy reaching the outer periphery of wheel 26. An outer surface 34 of wheel 26 may be at least partially transparent, such that the energy may pass therethrough. In one embodiment, curing location 30 is at the nip point of wheel 26. In another embodiment, curing location 30 may trail behind the nip point.

In order to inhibit energy dissipation and/or loss of the cure energy within compactor 24, outer surface 34 may be segmented via one or more dividers 36. Dividers 36 may lie in a plane generally aligned with and passing through an axis of wheel 26, and extend radially outward at least partially through outer surface 34. Dividers 36 may be fabricated from or otherwise coated with a material configured to reflect the energy from cure enhancer(s) 20. Any number of dividers 36 may be utilized to create as many separated energy-transmitting channels and/or energy-blocking areas as desired. In addition to dividers 36, it is contemplated that one or more dividers 38 lying in a plane generally orthogonal to (or oriented at an oblique angle relative to) the axis of wheel 26 may be used to further focus the energy from cure enhancer(s) 20. In some applications, a spacing between dividers 36 and/or 38 may be adjustable during material discharge to selectively vary and/or focus cure path parameters.

During discharge, the reinforcement may at least partially wrap around wheel 26 to the nip point at or near curing location 30. Cure energy may pass through wheel 26 and at least partially cure the coating of matrix on the reinforcement.

Figure 4:
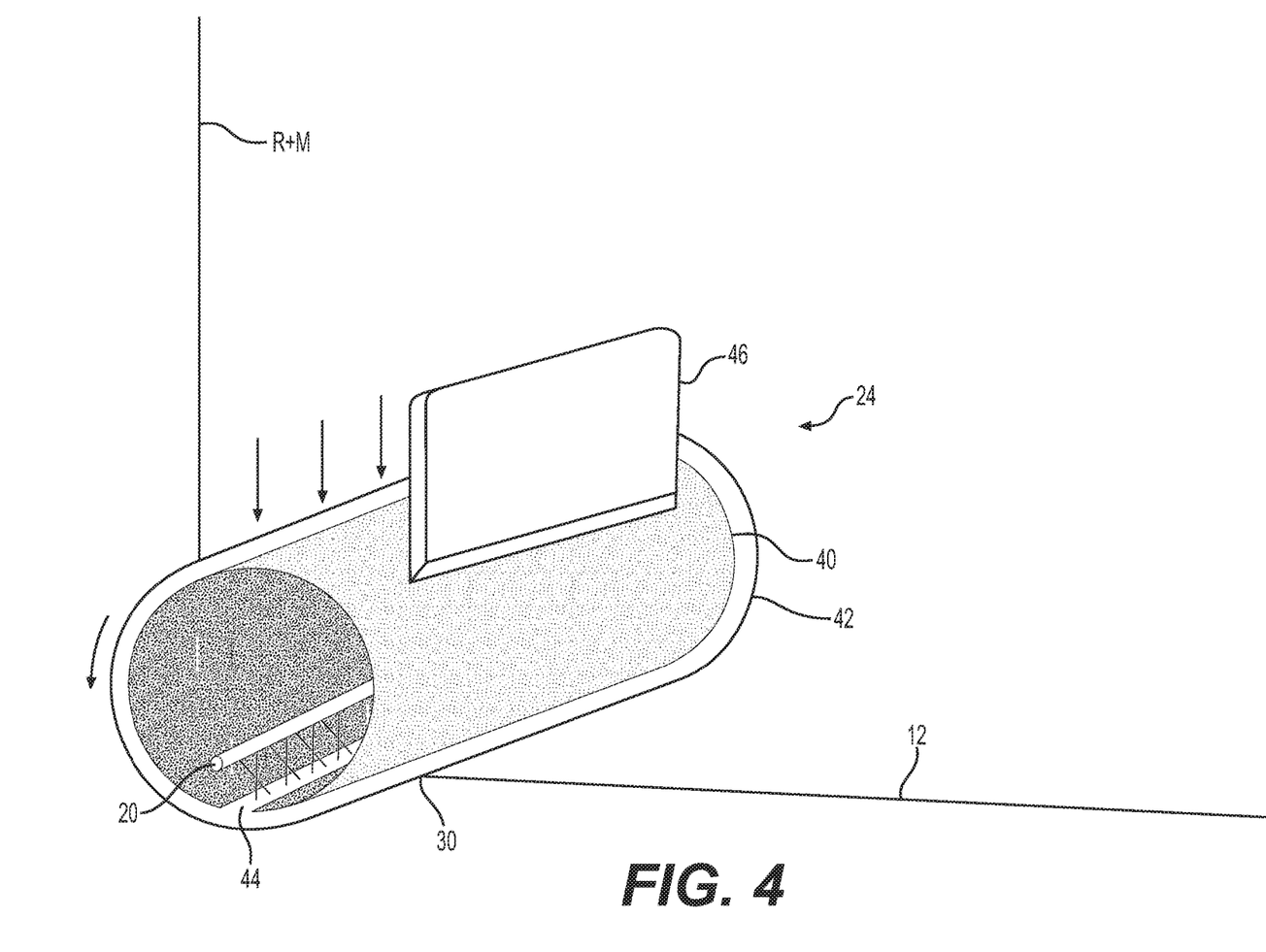
FIG. 4 is an isometric illustration of another exemplary disclosed compactor that may be utilized with the system of FIG. 1.

In another example of compactor 24 shown in FIG. 4, wheel 26 may be replaced with an inner roller 40 and an outer roller 42. Inner roller 40 may be generally stationary (e.g., with respect to head 16) during fabrication, while outer roller 42 may be configured to rotate and/or slide around the outside of inner roller 40. Inner roller 40 may be generally opaque and discontinuous (e.g., include an axially oriented slit 44) at the nip point, while outer roller 42 may be generally transparent and continuous. The energy from cure enhancer(s) 20 may be directed to slit 44, such that the matrix at the nip point is at least partially cured. In one embodiment, cure enhancer(s) 20 are located inside of inner roller 40. In another embodiment, energy conduits (e.g., one or more light pipes) extend from external cure enhancer(s) 20 to slit 44. The energy passing through slit 44 may generally form a line that extends orthogonally across the reinforcement wrapped around outer roller 42.

It is contemplated that the amount and/or intensity of energy within the line formed by slit 44 may be generally consistent along a length of the line. However, in some applications, it may be beneficial for portions of the line to have a greater amount and/or intensity of cure energy. This may be helpful, for example, when cornering, such that material at an outer radius of a corner (e.g., where a velocity of compactor 24 over the material may be greater) may be exposed to about the same amount and/or intensity of energy as material passing under compactor 24 at an inner radius of the corner. This gradient may be achieved via additional cure enhancer(s) 20 that are selectively activated, additional conduits that are selectively exposed to the cure energy, and/or conduits having greater energy passing capabilities.

During discharge of the composite material, the matrix may snap-cure as slit 44 moves over the material, thereby limiting wandering of the associated reinforcement in the axial direction of compactor 24. Both inner and outer rollers 40, 42 may be biased toward the discharging material (e.g., via a spring, a pneumatic piston, a mechanical bracket, etc.—not shown), such that the material is compacted by a desired amount at the time of curing.

In some applications, it may be possible for excess matrix material to cure onto the transparent outer surface of roller 42. In these applications, a scraper 46 may be provided to scrape away or otherwise remove the excess matrix.

Figure 5:
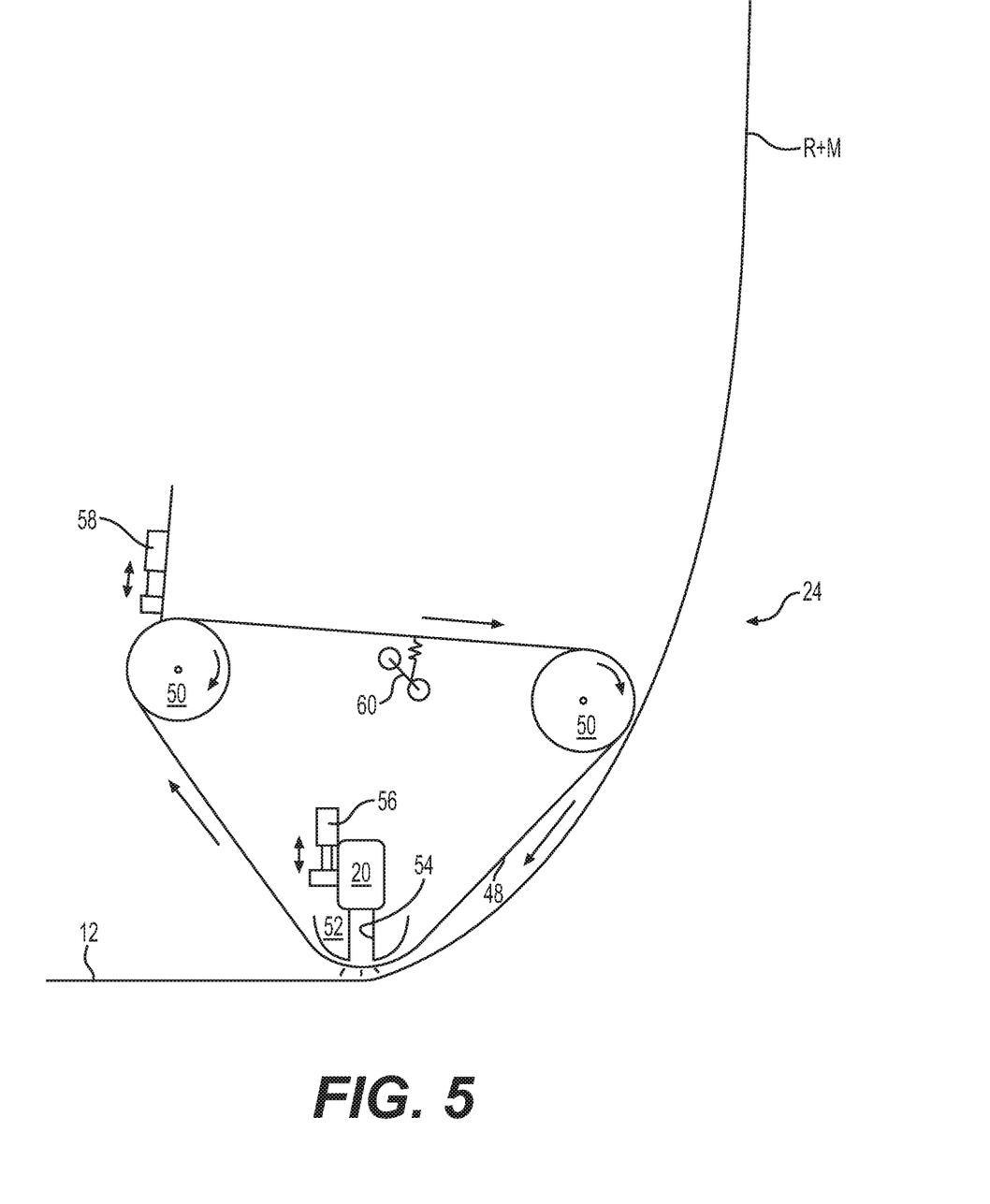
FIG. 5 is an end-view illustration of another exemplary disclosed compactor that may be utilized with the system of FIG. 1.

FIG. 5 illustrates another example of compactor 24, wherein cure energy passes around at least a portion of compactor 24 near the nip point. As seen in this embodiment, compactor 24 may have a belt 48 in place of wheel 26. Like wheel 26, belt 48 may be at least partially transparent. Belt 48 may be wrapped around one or more rollers 50, which may or may not be driven, and a guide 52. Energy may be directed from cure enhancer(s) 20 through a conduit 54, guide 52, and belt 48 to expose and cure the matrix coating the reinforcement. Guide 52 may be a cylindrical, spherical, or other shaped roller, partial roller, or fixed low-friction surface that is located at the outlet of conduit 54 to help guide belt 48 past the outlet. It is contemplated that any number of guides 52 may be arranged adjacent each other across a width of belt 48, if desired, for use in curing the matrix coating any number of adjacent reinforcements. In some embodiments, guides 52 may be individually position-adjustable (e.g., via one or more linear actuators 56), such that a transverse shape of the belt may be manipulated. Compactor 24 may be adjustable in a Z-direction (e.g., via a linear and/or rotary actuator 58), if desired. In some embodiment, a tensioner 60 may be utilized to maintain a desired tension within belt 48.

Although compactor 24 in the embodiments of FIGS. 2-5 have been described as capable of passing energy from cure enhancer(s) 20 radially outward in a directly generally aligned with an axis of head 16, other arrangements may be possible. FIGS. 6-14 illustrate some of these possible arrangements.

Figure 6:
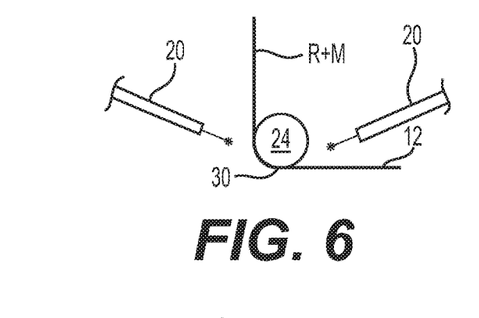
FIGS. 6-14 are schematic illustrations of various arrangements of compactors that may be utilized with the system of FIG. 1.
Figure 7:
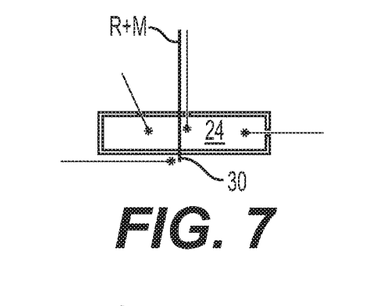
Figure 8:
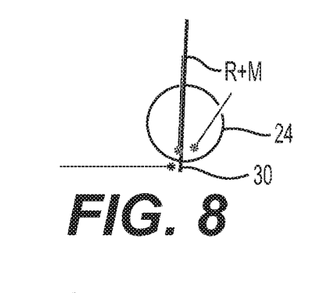

In the example of FIG. 6, cure energy may be directed from one or more cure enhancers 20 located at a leading side of compactor 24 (see left-most cure enhancer 20) toward the nip point at cure location 30, located at a trailing side of compactor 24 (see right-most cure enhancer 20) toward the nip point, or simultaneously from both the leading and trailing sides. As shown in FIGS. 7 and 8, the path(s) of energy from cure enhancer(s) 20 to the nip point at cure location 30 may be oriented generally orthogonal to the axis of compactor 24 (see upper-most paths of FIGS. 7 and 8), co-axial (see right-most path), parallel to the axis of compactor 24 (lower-most path), and/or at an oblique angle relative to the axis (see left-most path of FIG. 7 and right-most path of FIG. 8). The paths may pass through transparent portions (e.g., wheel 26) of compactor 24 or remain entirely outside of compactor 24.

Figure 9:
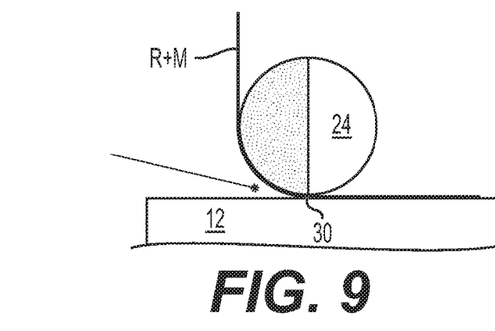
Figure 10:
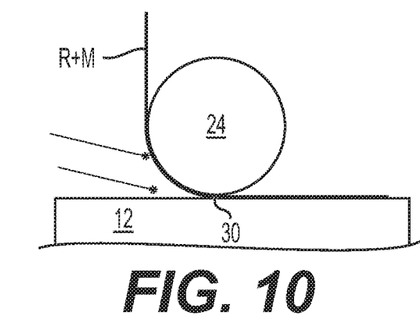
Figure 11:
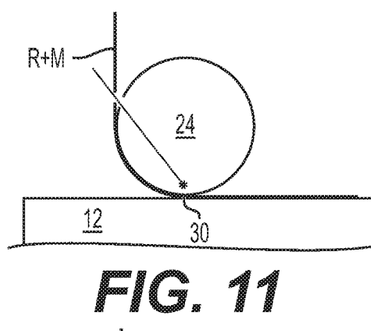

As shown in the examples of FIGS. 9 and 11, the path(s) of cure energy may be aimed at the nip point (i.e., at an intersection of a current material discharge and an underlying layer, such that both simultaneously receive energy). Alternatively, one or more paths of energy could be aimed separately at the discharging material and the underlying layer, for example at a location upstream of the nip point, as shown in FIG. 10. This may function to preheat and/or more deeply cure the underlying layer while initiating curing of the newly discharging layer. It is contemplated that a portion of compactor 24 (e.g., a portion of wheel 26) may be opaque (as shown in FIG. 9), to inhibit cure energy from passing therethrough to undesired locations.

Figure 12:
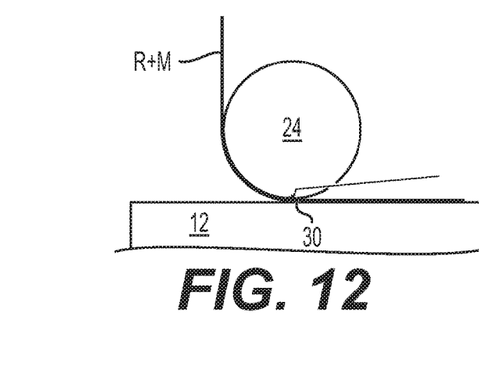
Figure 13:
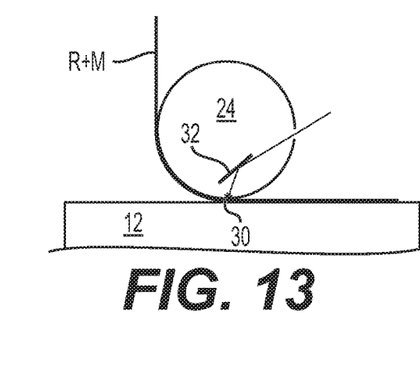

In some embodiments, instead of the energy path(s) passing straight through compactor 24, one or more of the path(s) may be redirected (e.g., bent—shown in FIG. 12 or reflected—shown in FIG. 13). This redirection of the energy path(s) may be accomplished via a change a density selection for a portion (e.g., for wheel 26) of compactor 24 and/or via optical component 32). Redirecting of the energy path may allow for more precise alignment of curing location 30 with the nip point of compactor 24, while avoiding interferences with other components, structures, and/or materials.

Figure 14:
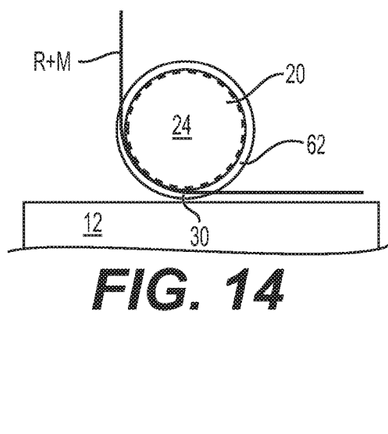

In a final example illustrated in FIG. 14, the path of cure energy may initiate inside of compactor 24 and extend radially outward. In one embodiment, the energy may be transmitted via any number of light pipes (like what is shown in FIG. 4) or similar conduits that are arranged axially around a perimeter of compactor 24. In another embodiment, the energy may be transmitted via any number of light pipes or similar conduits that are arranged annularly around the perimeter of compactor 24. For example, one or more light pipes could be arranged within an annular groove or channel 62 that passes through the nip point of compactor 24. Channel 62 may function to retain the discharging material at a desired axial location on compactor 24 and inhibit undesired wandering, especially during cornering of head 16.

INDUSTRIAL APPLICABILITY

The disclosed systems may be used to continuously manufacture composite structures having any desired cross-sectional shape and length. The composite structures may include any number of different fibers of the same or different types and of the same or different diameters, and any number of different matrixes of the same or different makeup. Operation of system 10 will now be described in detail.

At a start of a manufacturing event, information regarding a desired structure 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired weave patterns, weave transition locations, etc. It should be noted that this information may alternatively or additionally be loaded into system 10 at different times and/or continuously during the manufacturing event, if desired. Based on the component information, one or more different reinforcements and/or matrix materials may be selectively installed and/or continuously supplied into system 10.

To install the reinforcements, individual fibers, tows, and/or ribbons may be passed through head 16. In some embodiments, the reinforcements may be passed under compactor 24 (e.g., under wheel 26) and/or attached to anchor point 18. Installation of the matrix material may include filling head 16 and/or coupling of an extruder (not shown) to head 16.

The component information may then be used to control operation of system 10. For example, the reinforcements may be pulled and/or pushed along with the matrix material from head 16. Support 14 may also selectively move head 16 and/or the anchor point in a desired manner, such that an axis of the resulting structure 12 follows a desired three-dimensional trajectory. Once structure 12 has grown to a desired length, structure 12 may be severed from system 10.

The disclosed head 16 may have improved curing and discharge-location control. Curing may be improved via precise control over the location at which a desired amount and intensity of cure energy impinges discharging material. Discharge-location control may improve curing at the nip location, such that the discharging material does not move significantly after compactor 24 has moved over the material.

It will be apparent to those skilled in the art that various modifications and variations can be made to the disclosed system and head. Other embodiments will be apparent to those skilled in the art from consideration of the specification and practice of the disclosed system and head. For example, it is contemplated that the disclosed cure enhancer/compactor relationships may be applied to heads 16 which include a nozzle that feeds material to compactor 24 or that are nozzle-less, as desired. It is intended that the specification and examples be considered as exemplary only, with a true scope being indicated by the following claims and their equivalents.

What is claimed is:

1. An additive manufacturing system, comprising:
    a support;
    a print head mounted to and moveable by the support, the print head being configured to discharge a continuous reinforcement that is at least partially coated in a matrix;
    a wheel located at a discharge end of the print head and configured to roll over and compact the continuous reinforcement and the matrix during discharge of the continuous reinforcement and the matrix from the print head; and
    a cure enhancer configured to direct light energy toward the matrix during discharge, wherein the light energy passes through an annular surface of the wheel,
    wherein the annular surface of the wheel is at least partially transparent to the light energy and includes at least one divider configured to segment the annular surface into light-transmitting and light-blocking areas.

2. The additive manufacturing system of claim 1, wherein the cure enhancer is configured to simultaneously direct a first path of the light energy to a nip point of the wheel and a different second path of the light energy to the point trailing the nip point.

3. The additive manufacturing system of claim 1, wherein the cure enhancer is configured to direct the light energy starting from an exterior of the wheel into an axial end of the wheel and out through the annular surface of the wheel.

4. The additive manufacturing system of claim 1, wherein the cure enhancer is configured to direct a first path of the light energy to a nip point of the wheel and a different second path of the light energy to an underlying layer of material at a location leading the nip point.

5. The additive manufacturing system of claim 1, wherein the cure enhancer is configured to direct the light energy to the matrix after the wheel has compacted the continuous reinforcement against an underlying layer.

6. The additive manufacturing system of claim 1, wherein the cure enhancer is configured to direct the light energy through the wheel at an oblique angle relative to an axis of the wheel and relative to a plane that is orthogonal to the axis of the wheel.

7. The additive manufacturing system of claim 1, wherein the cure enhancer is configured to direct the light energy through the annular surface of the wheel to a nip point of the wheel and to a point trailing the nip point.

8. The additive manufacturing system of claim 7, wherein the annular surface of the wheel configured to bend the path of cure energy toward the nip point.

9. The additive manufacturing system of claim 8, wherein the wheel includes an annular groove configured to guide the continuous reinforcement.

10. The additive manufacturing system of claim 9, wherein the cure enhancer is configured to pass the cure energy radially outward through the annular groove.

11. The additive manufacturing system of claim 1, wherein the at least one divider includes a plurality of dividers that segment the wheel into a plurality of light-transmitting areas around a circumference of the annular surface.

12. The additive manufacturing system of claim 11, wherein:
   the plurality of dividers are planar and pass through an axis of the wheel; and
   the light-transmitting areas are arcuate segments located around the circumference of the wheel.

13. The additive manufacturing system of claim 11, wherein:
   the plurality of dividers are planar and at least one of orthogonal or obliquely oriented relative to an axis of the wheel; and
   the light transmitting segments are annular surfaces of the wheel.

14. The additive manufacturing system of claim 11, wherein the plurality of light-transmitting areas are channels radially oriented relative to an axis of the wheel.

15. The additive manufacturing system of claim 14, wherein the plurality of light-transmitting channels extend only partially through the annular surface of the wheel.

16. The additive manufacturing system of claim 1, wherein the cure enhancer is configured to direct the light energy toward the wheel from a leading side of the wheel.

17. The additive manufacturing system of claim 16, wherein:
   the cure enhancer is a first cure enhancer; and
   the additive manufacturing system further includes a second cure enhancer configured to direct a second path of light energy through the wheel toward the matrix from a trailing side of the wheel.

* * * * *